US005315745A

United States Patent [19]

Cantwell et al.

[11] Patent Number: 5,315,745

[45] Date of Patent: May 31, 1994

[54] HUB REMOVING TOOL

[75] Inventors: Gill Cantwell, Los Angeles; Gary Ramage, Chatsworth, both of Calif.

[73] Assignee: Paxton Products Inc., Camarillo, Calif.

[21] Appl. No.: 62,419

[22] Filed: May 13, 1993

[51] Int. Cl.[5] ..... B23P 19/02

[52] U.S. Cl. ..... 29/260

[58] Field of Search ..... 29/258-262, 29/266

[56] References Cited

U.S. PATENT DOCUMENTS

| | | | |
|---|---|---|---|
| 1,395,587 | 11/1921 | McLachlan . | |
| 2,288,906 | 7/1972 | Kaplan | 29/260 |
| 3,059,327 | 10/1962 | Burrows | 29/258 |
| 3,584,365 | 6/1971 | Cuen et al. . | |
| 3,862,483 | 1/1975 | Kloster . | |
| 4,209,888 | 7/1980 | Glasscock, Sr. . | |
| 4,259,774 | 6/1981 | Dolinski et al. . | |
| 4,343,075 | 8/1982 | Guptill et al. | 29/258 |
| 4,457,061 | 7/1984 | Eason . | |
| 4,472,869 | 9/1984 | Yasui et al. . | |
| 4,592,124 | 6/1985 | Keith . | |
| 4,642,866 | 5/1985 | Murtaugh . | |
| 5,174,023 | 12/1992 | Kilsdonk | 29/259 |

OTHER PUBLICATIONS

1993 Truecraft Tools Packaging.
1993 Lisle Supplement T-50 Leaflet p. 53.
1993 Installers, Pullers p. 249.
1993 Pulley Puller K-D Tools.

*Primary Examiner*—Robert C. Watson

[57] ABSTRACT

An improved tool for installing and removing a hub on a shaft Two sequential assembly configurations of a first screw, a nut, a thrust bearing, and a cup accomplish installation. Two additional sequential assembly configurations of the first screw, the nut, two plates, clamping members, a second screw, a pin, and a ball accomplish tool alignment and hub removal.

10 Claims, 6 Drawing Sheets

HUB REMOVING TOOL

This invention relates generally to hand tools and more particularly, to such a tool adapted for selectively installing and removing a hub on a shaft.

It is known in the prior art to provide tools for use in installing and removing accessory pulley hubs on power steering pump shafts, alternator shafts, and the like. In modern automotive design, these pulley hubs are pressed onto the shafts of accessory equipment, to provide mechanical power transmission to these accessories through flexible belt drives. Increasingly, these pressed on hub to shaft joints must be disassembled in the engine compartment of a motor vehicle, before the accessory unit can be removed, and must be reinstalled in the engine compartment after a replacement accessory unit is installed.

Paxton Products Incorporated of Camarillo, California is a manufacturer of Superchargers for automobiles and trucks. These superchargers are frequently sold to vehicle owners as complete kits with all the brackets, hoses, and hardware required to install the complete system onto a particular model of vehicle. These supercharger kits also include inexpensive tools and wrenches as required for the installation, if those tools are not readily available.

The installation of these kits frequently calls for the removal and relocation of engine accessory units, and therefore requires the use of a hub installing and removing tool.

Tools of the prior art are too expensive to include in these kits, therefore it is an object of the present invention to provide a tool that is low in cost.

Two diameters of hubs are currently in production. Prior art tools require a determination of hub diameter, followed by selective assembly to configure the tool to that specific hub diameter. It is an object of the invention to provide a single tool which automatically accommodates either diameter of hub.

A further object is to provide a single tool that both installs and removes hubs.

Another object is to provide a tool that is compact to enable use in engine compartments without removing radiators and other equipment.

Many prior art tools require the application of large size wrenches, not commonly available and difficult to use in the tight confines of an engine compartment, therefore another object is to provide for operation with small sizes of commonly available tools.

Some prior art tools are totally lacking in wrench application surfaces for the stationary element. These tools require rotation by impact wrench of the rotating element, while resisting rotation of the stationary element by a combination of inertial force and torque applied by a hand grip. If the hand grip fails to prevent rotation, injury is possible, therefore it is an object of the invention to provide wrench application surfaces for all elements.

Many prior art hub installation and removal tools, fail to provide adequate friction reducing bearings, thereby requiring excessive installation torque and generating excessive heat, therefore it is an object of the invention to provide superior friction reduction bearings for both installation and removal.

Prior art installation tools frequently fail to provide precise, flush, axial alignment between the end of the shaft and the end of the hub upon completion of the installation procedure. This failure results in axial misalignment of the belt system reducing the service life of the belt, therefore it is an object of the invention to provide automatic, precise alignment of shaft and hub upon completion of the installation procedure.

Some prior art tools abrade and erode the mating surfaces of the shaft and hub which adds a further axial alignment error, therefore it is a further object to provide a tool which does not damage either the shaft or the hub.

Some prior art tools are lacking in durability, and are quickly damaged in normal operation, therefore it is a further object to provide a tool which is durable and long lasting.

Additional objects and advantages of the present invention will become apparent from the following description, reference being had to the accompanying drawings wherein a preferred embodiment of the present invention is clearly shown.

and

Figure 24:
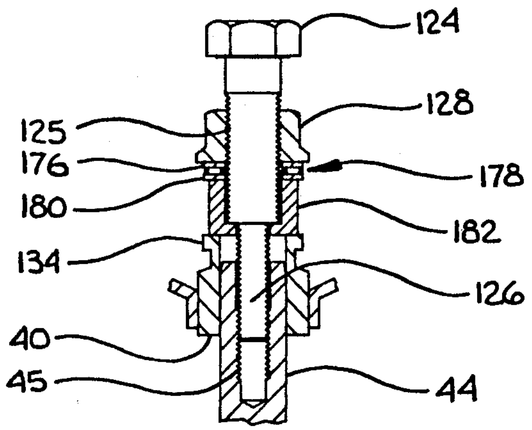
FIG. 24 is a partially sectioned elevation view of the tool of FIG. 23 showing the tool reconfigured for the final installation procedure and showing the beginning of that procedure.
Figure 25:
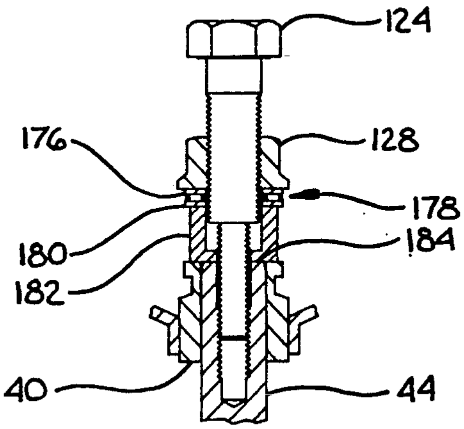

FIG. 25 is a partially sectioned elevation view of the tool of FIG. 24 showing the completion of the final installation procedure.

The reference numerals used in the drawings are:

30; Sixth nut
32; Slot in 30
34; First pusher
38; Sixth screw
39; Pulley assembly
40; Hub
42; Pulley flange
44; Shaft
45; Internal screw thread in 44
46; Second nut
48; Second pusher
50; First hooked arm
52; First surface of 46
54; First bolt
56; Second hooked arm
58; Second surface of 46
60; Second bolt
62; Third surface of 46
64; Fourth surface of 46
66; Seventh screw
68; Third screw
70; Third nut
72; First body
74; First sleeve
75; Pocket
76; Threaded elongation of 68
78; Fourth screw
80; Fourth nut
82; First hooked sleeve
84; Second hooked sleeve
86; First collar
88; First end of 82
89; First end of 84
90; Second end of 82
91; Second end of 84
92; Second sleeve
94; Threaded elongation of 78
96; First washer
98; Second washer
100; Fifth screw
101; Threaded elongation of 100
102; Fifth nut
104; Third hooked arm
106; Fourth hooked arm
108; Second collar
110; Third bolt
112; Third sleeve
114; Ball thrust bearing
116; First end of 104
118; Second end of 104
120; First end of 106
122; Second end of 106
124; Second screw
125; Large screw thread on 124
126; Threaded elongation of 124
128; First nut
130; First plate
132; Second plate
134; Flange on 40
136; Circumferential groove on 40
138; Fourth bolt
140; Fifth bolt
142; First hole in 130
144; Second hole in 130
146; First hole in 132
148; Second hole in 132
150; First slot in 130
152; Second slot in 130
154; First slot in 132
156; Second slot in 132
158; Seventh nut
160; Eighth nut
162; Flange On 128
164; Internal hexagonal socket in 44
165; Axially drilled hole in 44
166; Tang on 130
168; Tang on 132
170; Ball
172; Pin
174; First screw
176; Third washer
178; Needle thrust bearing assembly
180; Fourth washer
182; Cup
184; Surface on 182

Figure 1:
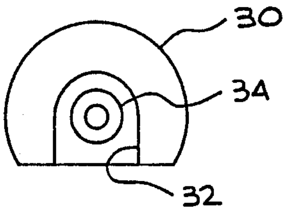
FIG. 1 PRIOR ART
FIG. 1 is an axial view of a prior art removal tool.
Figure 2:
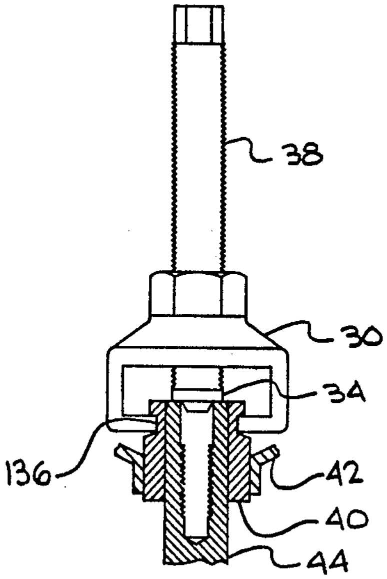
FIG. 2 PRIOR ART
FIG. 2 is a partially sectioned elevation view of the prior art tool of FIG. 1 showing the beginning of the removal procedure.
Figure 3:
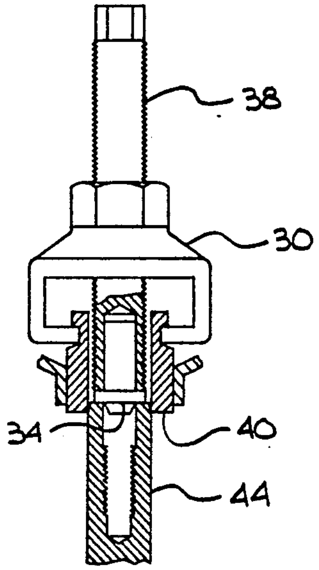
FIG. 3 PRIOR ART
FIG. 3 is a partially sectioned elevation view of the prior art tool of FIG. 2 showing the completion of the removal procedure.
Figure 7:
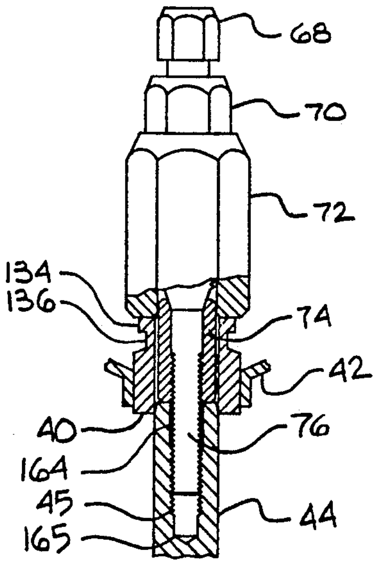
FIG. 7 PRIOR ART
FIG. 7 is a partially sectioned elevation view of a prior art installation tool showing the beginning of the installation procedure.
Figure 8:
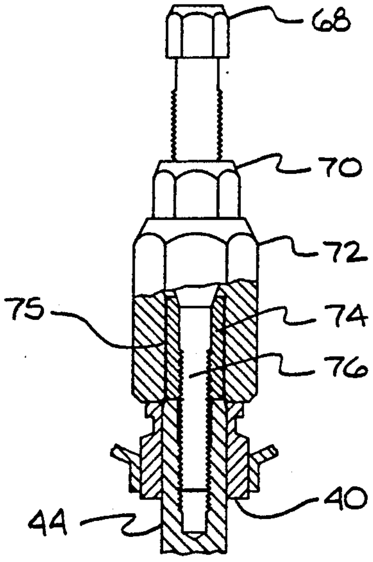
FIG. 8 PRIOR ART
FIG. 8 is a partially sectioned elevation view of the prior art tool of FIG. 7 showing the completion of the installation procedure.

Before describing the invention in detail, conventional installers and removers will be described. FIGS. 1, 2, and 3 represent a prior art tool manufactured by Snap-on Tools Corporation of Kenosha, Wis. for removing a pressed on hub member from a shaft such as the hub portion of the accessory drive pulley assembly shown in FIG. 21. FIGS. 7 and 8 represent a prior art tool manufactured by Truecraft Tools of Somerset, N.J. for installing the hub member. In order to understand the operation of the conventional prior art tools of FIGS. 1, 2, 3, 7, and 8 in a particular application, reference will be made to the hub and shaft shown in FIG. 7.

In FIG. 7 a device to be driven, such as a power steering pump or an alternator, is provided with a shaft 44, usually 0.750 inches in diameter. Shaft 44 includes a drilled hole 165, an internal screw thread 45, and usually an internal hexagonal socket 164. Internal screw thread 45 is ⅜-16 in size.

A pulley (not shown) for driving the device includes a pulley flange 42 and a hub 40. The hub 40 includes a flange 134 and a circumferential groove 136.

Returning now to the prior art tool of FIG. 2, this hub removal tool consists of a first pusher 34 which in operation bears against the end of shaft 44; A sixth screw 38 which abuts against pusher 34; and a sixth nut 30 which threadably engages sixth screw 38 and slidably engages circumferential groove 136. Nut 30 is a heavy steel forging. FIG. 2 shows the tool at the beginning of the removal procedure. The tool has been installed finger tight, but removal has not yet begun. FIG, 1 represents an axial view facing the pusher 34 of the tool of FIG. 2 showing slot 32 in first nut 30. Since slot 32 is machined to fit only one diameter of hub, a separate removal tool is required to remove the other standard hub diameter. FIG. 3 represents the tool of FIG. 2 showing the completion of the removal procedure. Screw 38 has been rotated relative to nut 30, forcing pusher 34 and shaft 44 into hub 40. Shaft 44 has just been released from hub 40.

Returning now to the prior art tool of FIG. 7, this hub installation tool consists of a third screw 68, threadably engaged in a third nut 70, and a first body 72. A ball type thrust bearing (not shown) is installed between nut 70 and body 72. Threaded elongation 76 threadably engages first sleeve 74. The tool is shown at the beginning of the installation procedure, having been assembled finger tight, but with installation not yet begun. Hub 40 has been assembled over sleeve 74, and threaded elongation 76 has been threadably engaged in thread 45 in shaft 44. In FIG. 8, the tool of FIG. 7 is shown at the completion of the installation procedure. Nut 70 has been rotated relative to screw 68 forcing body 72 and hub 40 over sleeve 74 and shaft 44 until sleeve 74 bottoms in pocket 75 in body 72. Due to manufacturing tolerances, the length of sleeve 74 and the depth of pocket 75 are never exactly equal, and in practice are substantially unequal, therefore the abutting surfaces of hub 40 and shaft 44 are not coplanar, and the hub is axially misaligned by the amount of that inequality.

Figure 4:
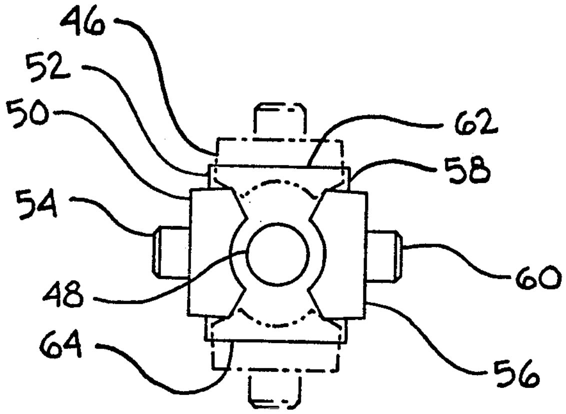
FIG. 4 PRIOR ART
FIG. 4 is an axial view of a prior art removal tool with movable hooked arms.
Figure 5:
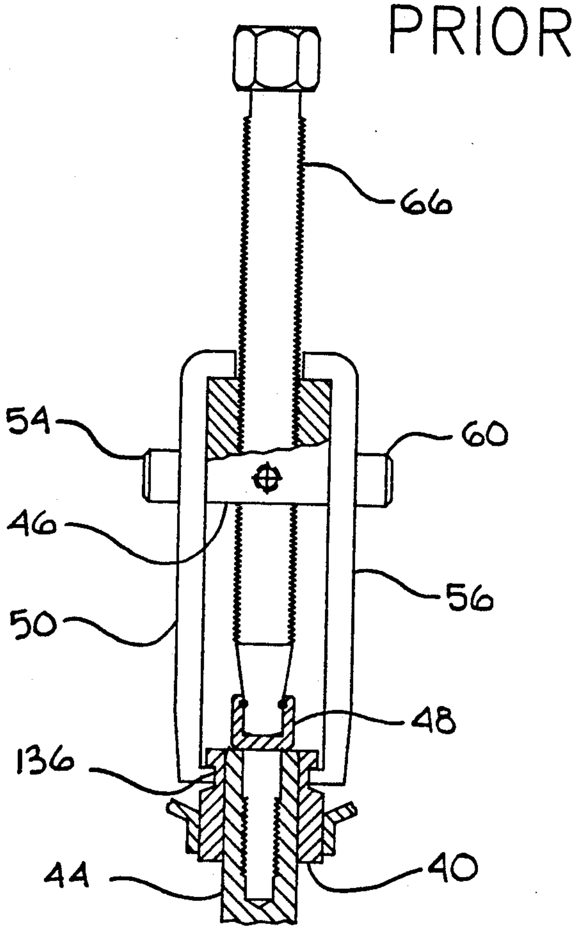
FIG. 5 PRIOR ART
FIG. 5 is a partially sectioned elevation view of the prior art tool of FIG. 4 showing the beginning of the removal procedure.
Figure 6:
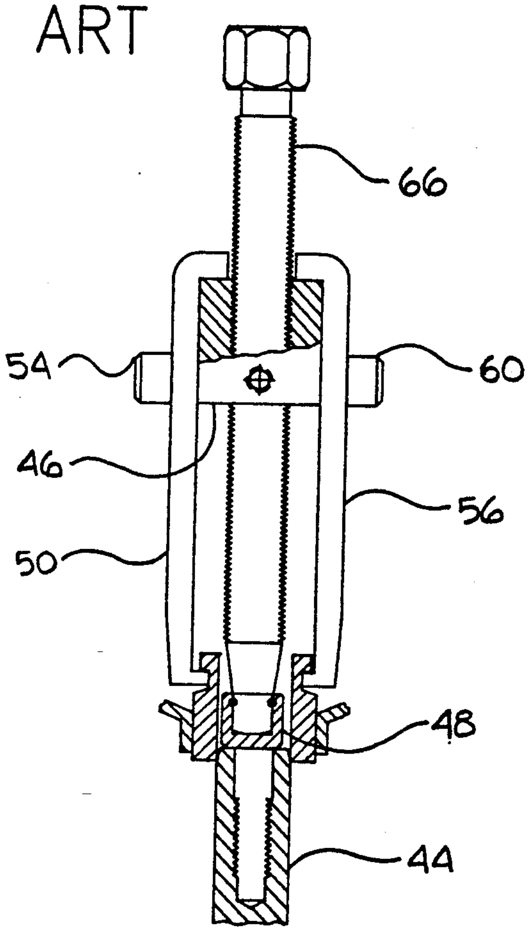
FIG. 6 PRIOR ART
FIG. 6 is a partially sectioned elevation view of the prior art tool of FIG. 5 showing the completion of the removal procedure.

FIGS. 4, 5, and 6 represent a prior art tool manufactured by Truecraft Tools of Somerset, N.J. for the removal of hubs. In FIG. 5 the tool is shown with a seventh screw 66 threadably engaging a second nut 46; a second pusher 48 abutting shaft 44; a first hooked arm 50 secured to nut 46 by first bolt 54; and a second hooked arm 56 secured to nut 46 by second bolt 60. Hooked arms 50 and 56 engage circumferential groove 136 in hub 40. FIG. 5 shows the tool at the beginning of the removal procedure. The tool has been installed finger tight, but removal has not yet begun. FIG, 4 represents an axial view facing the second pusher 48 of the tool of FIG. 5 showing first hooked arm 50 attached to first surface 52 of second nut 46 with first bolt 54. Second hooked arm 56 is attached to second surface 58 of nut 46. Shown in phantom is an alternate configuration to accommodate hubs of a larger diameter, wherein hooked arms 50 and 56 are attached instead to surfaces 62 and 64 of nut 46. FIG. 6 shows the prior art tool of FIG. 5 at the completion of the removal procedure. Second screw 66 has been rotated relative to second nut 46 forcing second pusher 48 and shaft 44 through hub 40. First hooked arm 50 is attached to second nut 46 with first bolt 54, and second hooked arm 56 is attached to nut 46 with second bolt 60.

Figure 9:
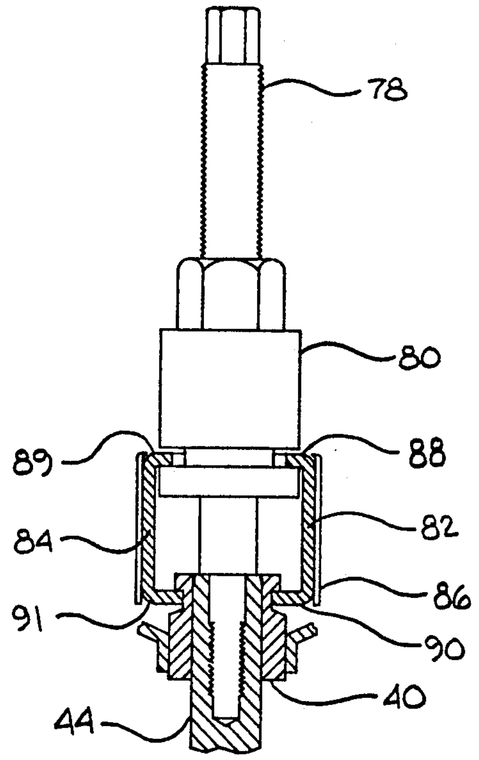
FIG. 9 PRIOR ART
FIG. 9 is a partially sectioned elevation view of a prior art combination removal and installation tool, configured for removal and showing the beginning of the removal procedure.
Figure 10:
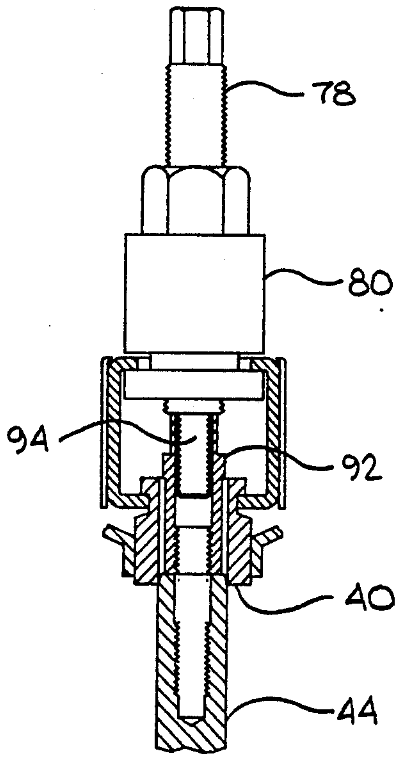
FIG. 10 PRIOR ART
FIG. 10 is a partially sectioned elevation view of the prior art tool of FIG. 9 showing the completion of the removal procedure.

FIGS. 9, 10, 11, and 12 represent a prior art tool manufactured by K-D Tools of Lancaster, Pennsylvania for both installing and removing hubs. In FIG. 9 the tool is shown configured for removing the hub, and is shown at the beginning of the procedure as installed finger tight. Fourth screw 78 is threadably engaged into fourth nut 80. First hooked sleeve 82 is engaged with nut 80 at first end 88, and with hub 40 at second end 90. Second hooked sleeve 84 is engaged with nut 80 at first end 89, and with hub 40 at second end 91. First collar 86 is slidably assembled over sleeves 82 and 84 containing them around hub 40. Screw 78 abuts second sleeve 92 which abuts shaft 44. This tool can be configured to accommodate the other diameter of hub by installing the two hooked sleeves 82 and 84 rotated end for end, with ends 88 and 89 engaging hub 40, and ends 90 and 91 engaging nut 80. In FIG. 10, the tool is shown at the completion of the removal procedure. Fourth screw 78 has been rotated relative to fourth nut 80. Second sleeve 92, and shaft 44 have been driven through hub 40. This tool does not contain rolling element, antifriction bearings. The relative rotation between the screw 78 and the shaft 44 causes sliding at either the end of sleeve 92 which abuts screw 78, or at the end of sleeve 92 which abuts shaft 44. This sliding occurs at the same time a substantial axial load is being applied.

Figure 11:
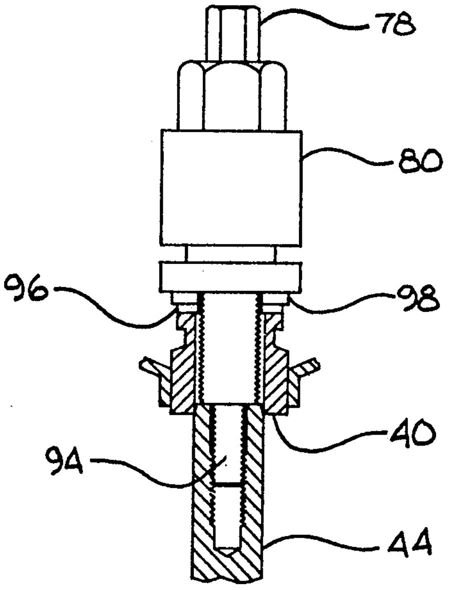
FIG. 11 PRIOR ART
FIG. 11 is a partially sectioned elevation view of the prior art tool of FIG. 9, configured for installation and showing the beginning of the installation procedure.
Figure 12:
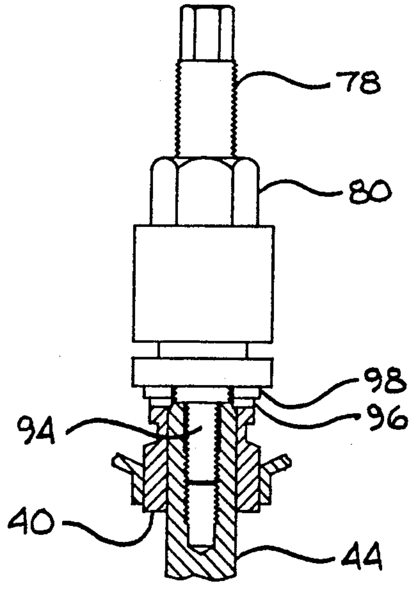
FIG. 12 PRIOR ART
FIG. 12 is a partially sectioned elevation view of the prior art tool of FIG. 11 showing the completion of the installation procedure.

FIG. 11 represents the tool of FIG. 9 configured for the installation procedure. The tool is shown at the beginning of the procedure, having been assembled finger tight, but with installation not yet begun. Fourth screw 78 is threadably engaged in fourth nut 80. Threaded elongation 94 of screw 78 is threadably engaged in shaft 44. Nut 80 abuts second washer 98 which abuts first washer 96 which abuts hub 40. FIG. 12 shows the tool of FIG. 11 after completion of the installation procedure. Screw 78 has been rotated relative to nut 80 forcing washers 98 and 96, and hub 40 onto shaft 44. Washer 96 is steel. Washer 98 is sintered bronze. During installation, relative rotation between nut 80 and hub 40 causes slippage between either nut 80 and washer 98, or washer 98 and washer 96, or washer 96 and hub 40. This slippage must occur while the parts are under substantial axial load. This tool generates substantial friction during both installation and removal procedures. The hole through washer 96 is 0.631 inches in diameter. The chamfered end of shaft 44 is smaller in diameter than 0.631 inches, and the shaft is pulled partially into the washer 96 resulting in misalignment of the pulley.

Figure 13:
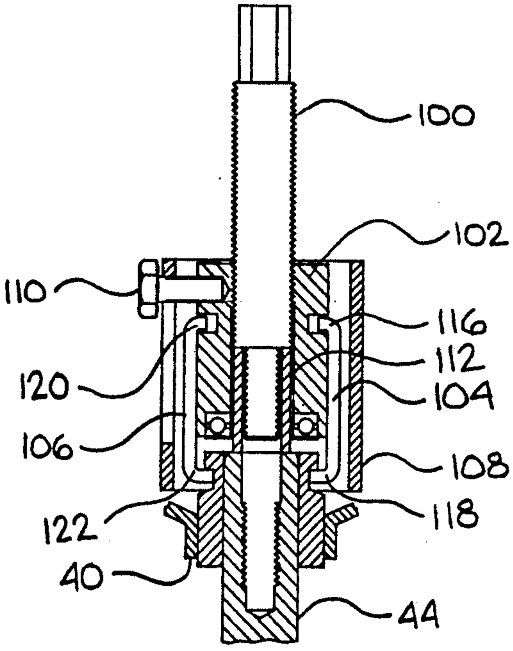
FIG. 13 PRIOR ART
FIG. 13 is a partially sectioned elevation view of a prior art combination removal and installation tool, configured for removal and showing the beginning of the removal procedure.
Figure 14:
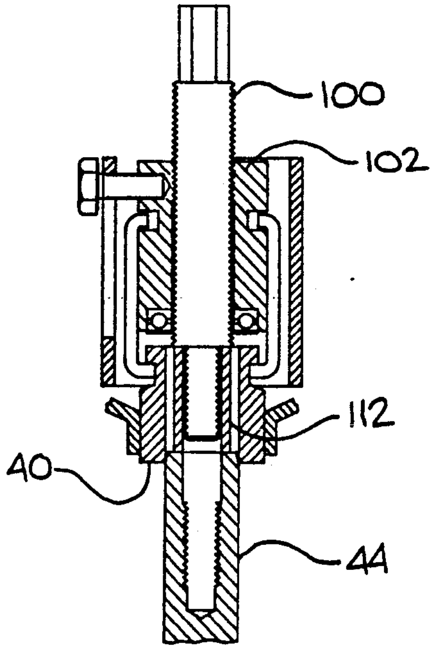
FIG. 14 PRIOR ART
FIG. 14 is a partially sectioned elevation view of the prior art tool of FIG. 13 showing the completion of the removal procedure.

FIGS. 13, 14, 15, and 16 represent a prior art tool manufactured by Lisle Corporation of Clarinda, Iowa for both installing and removing hubs. In FIG. 13 the tool is shown configured for removing the hub, and is shown at the beginning of the procedure as installed finger tight. Fifth screw 78 is threadably engaged into fifth nut 102. Third hooked arm 104 is engaged with nut 102 at first end 116, and with hub 40 at second end 118. Fourth hooked arm 106 is engaged with nut 102 at first end 120, and with hub 40 at second end 122. Second collar 108 is slidably assembled over arms 104 and 106 containing them around hub 40. Third bolt 110 limits the slidable travel of collar 108. Hooked arms 104 and 106 are representative of a total of six such arms (four not shown) surrounding hub 40. Screw 100 abuts third sleeve 112 which abuts shaft 44. This tool can be configured to accommodate the other diameter of hub by installing the hooked sleeves 104 and 106 rotated end for end, with ends 116 and 120 engaging hub 40, and ends 118 and 122 engaging nut 102. In that configuration, the other four hooked arms (not shown) would also be rotated end for end. In FIG. 14, the tool is shown at the completion of the removal procedure. Fifth screw 100 has been rotated relative to fifth nut 102. Third sleeve 112, and shaft 44 have been driven through hub 40. The relative rotation between the screw 100 and the shaft 44 causes sliding at either end of the sleeve 112 which abuts the end of screw 100, or the end of the sleeve 112 which abuts the end of shaft 44. This sliding motion at the same time that substantial axial load is applied generates substantial heat and friction, and damages both the tool and the shaft 44.

Figure 15:
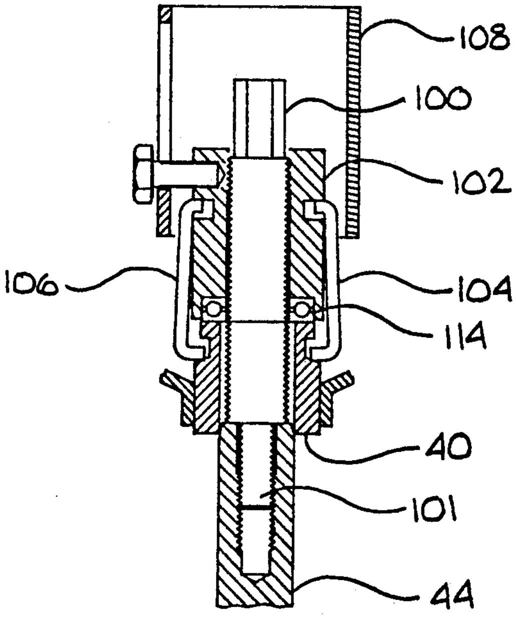
FIG. 15 PRIOR ART
FIG. 15 is a partially sectioned elevation view of the prior art tool of FIG. 13, configured for installation and showing the beginning of the installation procedure.
Figure 16:
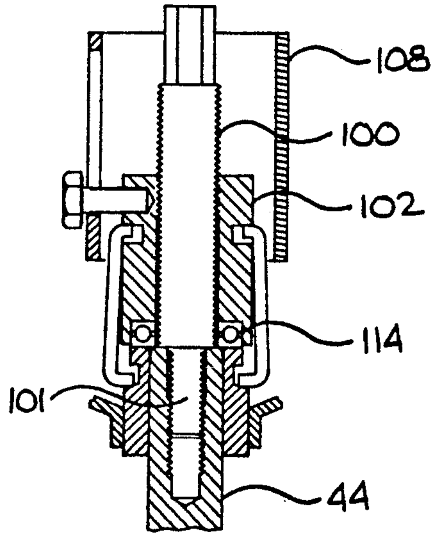
FIG. 16 PRIOR ART
FIG. 16 is a partially sectioned elevation view of the prior art tool of FIG. 15 showing the completion of the installation procedure.

FIG. 15 represents the tool of FIG. 13 configured for the installing procedure. The tool is shown at the beginning of the installation procedure, having been assembled finger tight, but with installation not yet begun. Fifth screw 100 is threadably engaged in fifth nut 102. Threaded elongation 101 of screw 100 is threadably engaged in shaft 44. Ball thrust bearing 114, a part of nut 102 abuts hub 40. Second collar 108 is slid away from arms 104 and 106, allowing them to fall away from hub 40. FIG. 16 shows the tool of FIG. 13 after completion of the installation procedure. Screw 100 has been rotated relative to nut 102 forcing hub 40 onto shaft 44. The chamfered end of shaft 44 has entered the chamfer in the ball thrust bearing 114 resulting in misalignment of the pulley.

Turning now to the present invention, FIGS. 17, 18, 19, and 20 represent the tool of the current invention, configured for the removal procedure, and installed on a typical pulley assembly.

Figure 17:
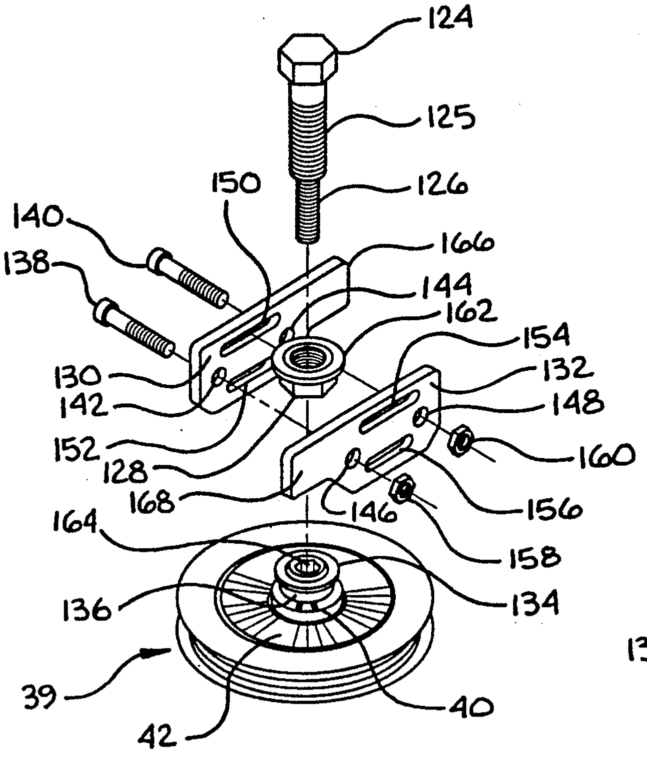
FIG. 17 is a perspective exploded view of the present invention showing the component parts separated prior to assembly thereof in the initial assembly step to configure the tool for hub removal.

FIG. 17 shows the initial assembly stage in configuring the tool assembly for the removal process. The tool includes threaded screws, a flanged nut and spaced-apart plates with slot means. The plates are held in place with a clamping means shown as a pair of nuts and bolts. The above assembly is used to remove a typical pulley assembly 39 from a drive shaft 44. The pulley assembly includes a hub 40 and a pulley flange 42. Hub 40 includes hub flange 134 and circumferential slot 136, and internal hexagonal socket 164. Second screw 124 includes a large screw thread 125 and a threaded elongation 126. In the preferred embodiment, screw 124 is fabricated by machining a ⅜-16 female thread 0.75 inches deep in the threaded end of a ⅝-16×2.00 inch long, hex head bolt; and installing into that thread with Loctite #271 adhesive, a ⅜-16 threaded rod 2.00 inches long, leaving 1.25 inches of ⅜-16 thread projecting as threaded elongation 126. Shown about to be threadably engaged with large screw thread 125, is first nut 128 which includes nut flange 162. Nut 128 can be purchased from Maclean-Fogg Company of Mundelein, Ill. as Whiz-Lock Nut, part number 31WLF5811. First plate 130 which includes first slot 150, second slot 152, first hole 142, second hole 144 and first tang 166; is stamped from 0.190 thick 4130 steel plate, and heat treated to Rockwell hardness C43–C45. Second plate 132 is identical to plate 130, and includes first slot 154, second slot 156, first hole 146, second hole 148, and second tang 168. Threaded elongation 126 of screw 124 is shown about to be threadably engaged into hub 40. Plate 130 is shown about to be abutted against hub 40 and nut 128 with hub flange 134 projecting into slot 152 and flange 162 projecting into slot 150. Plate first plate 132 is shown about to be abutted against hub 40 and nut 128 with flange 134 projecting into slot 156 and nut flange 162 projecting into first slot 154. Fourth bolt 138 is shown about to be inserted through hole 142 and hole 146 to threadably engage seventh nut 158. Fifth bolt 140 is shown about to be inserted through hole 144 and hole 148 to threadably engage eighth nut 160. Bolts 138 and 140 are ¼-20×1.75 inches long socket head cap screws. Nuts 158 and 160 ¼-20 hex nuts.

Figure 18:
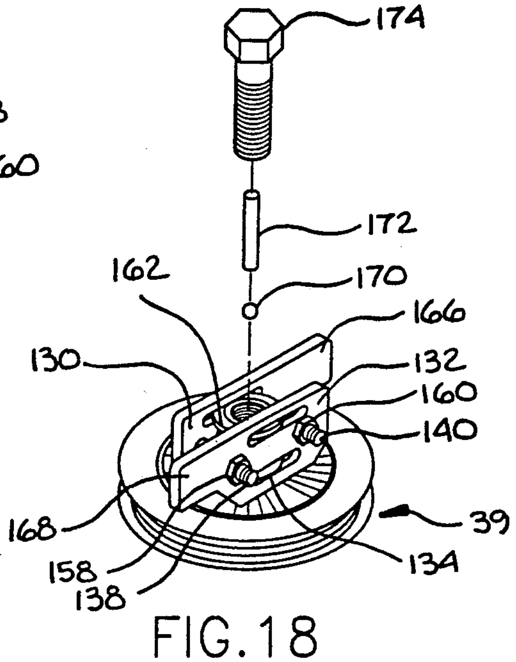
FIG. 18 is a partially exploded perspective view of the present invention showing the final assembly step to configure the tool for hub removal.

FIG. 18 shows the final assembly stage in configuring the tool for the removal process including a typical pulley assembly 39. Second screw 124, shown in the previous assembly stage of FIG. 17, has been removed and is no longer shown. First plate 130 and second plate 132 are shown clamped together with bolts 138 and 140 and nuts 158 and 160; and engaging flanges 162 and 134. Tangs 166 and 168 are preferably disposed in opposite directions as shown. Ball 170, pin 172, and first screw 174 are shown ready to be assembled. Ball 170 is a hardened alloy steel ball, ¼ inch in diameter. Pin 172 is a hardened alloy steel dowel pin ¼ inch in diameter by 1½ inch long. First screw 174 is a ⅜-18×2 inch hex head bolt.

Figure 19:
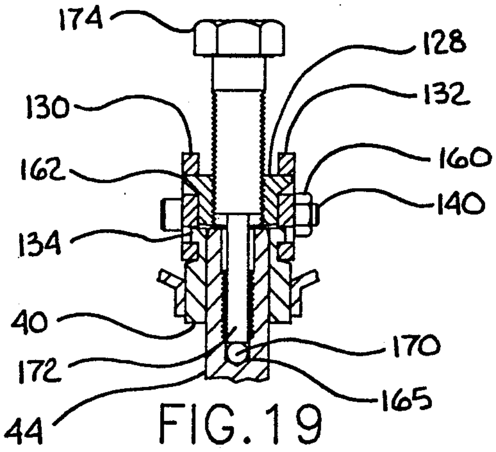
FIG. 19 is a partially sectioned elevation view of the present invention, configured for removal and showing the beginning of the removal procedure.

FIG. 19 shows the tool configured for removing the hub and is shown at the beginning of the removal procedures as installed finger tight. First plate 130 and second plate 132 are clamped to hub 40 and first nut 128 by fifth bolt 140 and eighth nut 160, and engage flange 162 on first nut 128 and flange 134 on hub 40. First screw 174 is threadably engaged in first nut 128, and abuts pin 172 which abuts ball 170 which abuts the end of drilled hole 165 in shaft 44.

Figure 20:
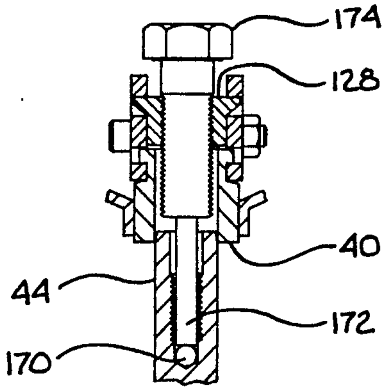
FIG. 20 is a partially sectioned elevation view of the tool of FIG. 19 showing the completion of the removal procedure.

FIG. 20 shows the tool of FIG. 19 at the completion of the removal procedure. First screw 174 has rotated relative to first nut 128 and has forced pin 172, ball 170, and shaft 44 from hub 40.

FIGS. 21, 22, 23, 24, and 25 represent the tool of the current invention, configured for the installation procedure.

Figure 21:
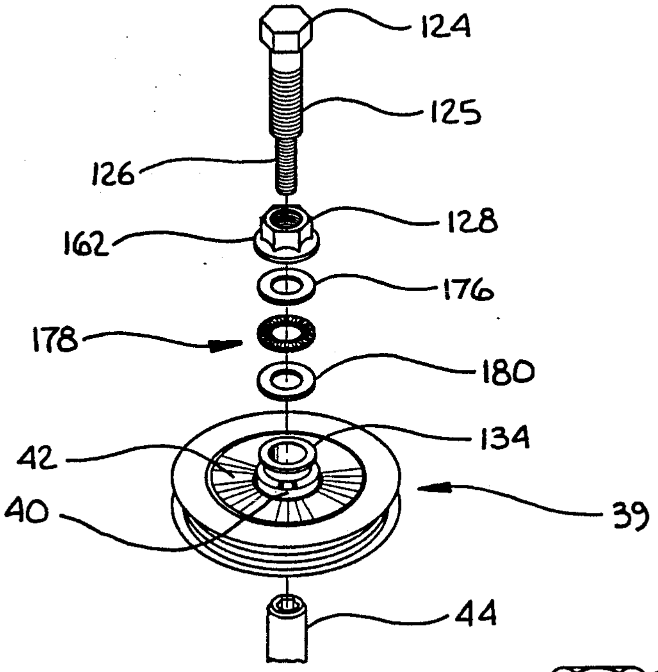
FIG. 21 is a perspective exploded view of the present invention showing the component parts separated prior to assembly thereof into the initial installing configuration.

FIG. 21 shows a typical pulley assembly 39 which includes a pulley flange 42, and a hub 40. Hub 40 further includes hub flange 134. Also shown is a typical shaft 44 which is to be installed into hub 40. The tool itself is comprised of second screw 124 with large thread 125 and threaded elongation 126, first nut 128 with flange 162, third washer 176, needle thrust bearing assembly 178, and fourth washer 180. Washer 176 is a hardened steel washer, 1/16 of an inch thick, 0.630 inch inside diameter, and 1⅛ outside diameter and can be purchased from The Torrington Company of Torrington, Conn. as Thrust Washer, part number TRB-1018. Washer 180 is identical to washer 176. Needle thrust bearing assembly 178 can be purchased from The Torrington Company of Torrington, Conn. as part number NTA-1018.

Figure 22:
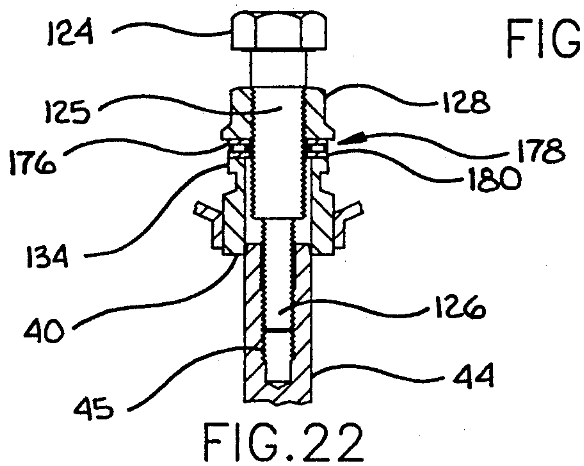
FIG. 22 is a partially sectioned elevation view of the tool of FIG. 21 configured for the initial installation procedure showing the beginning of that procedure.

FIG. 22 shows the tool of FIG. 21 assembled finger tight, configured to begin the initial installation procedure. Second screw 124 is threadably engaged with first nut 128 at large thread 125. Screw 124 is also threadably engaged with internal screw thread 45 in shaft 44 at threaded elongation 126. First nut 128 abuts third washer 176 which abuts needle thrust bearing assembly 178 which abuts fourth washer 180 which abuts flange 134 on hub 40.

Figure 23:
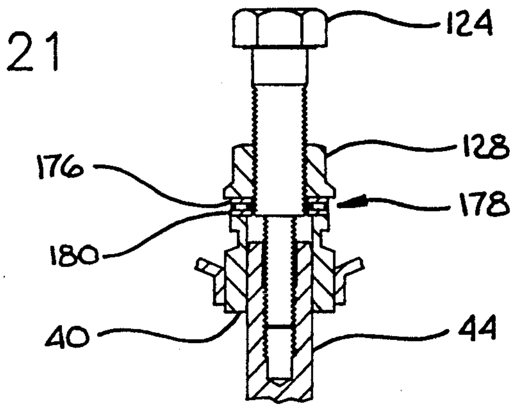
FIG. 23 is a partially sectioned elevation view of the tool of FIG. 22 showing the completion of the initial installation procedure.

FIG. 23 shows the tool of FIG. 22 at the completion of the initial installation procedure. First nut 128 has been rotated 13 turns relative to second screw 124. Nut 128 acting through washer 176, needle thrust bearing assembly 178, and washer 180; has forced hub 40 partially onto shaft 44.

FIG. 24 shows the tool of FIG. 23 reconfigured, assembled finger tight, and ready to begin the final installation procedure Second screw 124 is threadably engaged with first nut 128 at large thread 125. Screw 124 is also threadably engaged with internal screw thread 45 in shaft 44 at threaded elongation 126. First nut 128 abuts third washer 176 which abuts needle thrust bearing assembly 178 which abuts fourth washer 180 which abuts newly installed alignment means, cup 182, which abuts flange 134 on hub 40. Cup 182 is steel, 1.00 inches in diameter and 0.63 inches long. It is counterbored 0.641 diameter by 0.50 deep, and has a 0.386 diameter through hole.

FIG. 25 shows the tool of FIG. 24 at the completion of the second half of the installation procedure. First nut 128 has been rotated relative to second screw 124. First nut 128 acting through third washer 176, needle thrust bearing assembly 178, fourth washer 180, and cup 182; presses hub 40 onto shaft 44 until surface 184 of cup 182 abuts the end of shaft 44. Since both shaft 44 and hub 40 abut surface 184 of cup 182, they are coplanar at the surface defined by surface 184, and the pulley system is correctly axially aligned.

In operation, referring to FIG. 17 showing the initial assembly step in configuring the tool for the removal procedure, first nut 128 is threaded onto large thread 125 of second screw 124. Threaded elongation 126 is then threaded into shaft 44 (not shown). Plates 130 and 132 are clamped onto hub 40 and first nut 128 with bolts 138 and 140 and nuts 158 and 160.

Hub 40 may be of either standard diameter. In either case plates 130 and 132 accommodate the minor difference in diameter, and no special actions are required by the user.

Second screw 124 was used only for alignment, and is now unscrewed from the assembly. Due to the difference in thread pitch between the large thread 125 (18 threads per inch) and the threaded elongation 126 (16 threads per inch), plates 130 and 132 may need to be rotated slightly counterclockwise relative to the hub when the second screw 124 is being unscrewed. An alternate construction utilizes identical thread pitches in threads 125 and 126 to eliminate this rotation. After removing second screw 124, a hardened steel ball 170 is placed in the drilled hole 165 of the hub 40. Then a hardened steel dowel pin 172 is placed in the drilled hole 165 of the hub 40. Finally, first screw 174 is screwed into first nut 128 until the end of screw 174 abuts the end of pin 172. The function of the ball 170 and pin 172 is to provide an axial point of contact of small diameter to permit rotation while under a high thrust load without generating significant friction, heat, or wear. Other constructions are anticipated such as combining the pin and the ball by providing a spherical end to the pin, and that spherical end might abut the end of screw 174 or the end of the drilled hole 165, but the preferred embodiment is the pin and ball as shown, with the relative motion occurring between these two hardened steel members. After finger tightening first screw 174 into first nut 128 as shown in FIG. 19 a 15/16 inch wrench is applied to the hex end of screw 174. This can be a socket, box, or open end wrench, however it is an advantage of the present invention, that by using an open end wrench on this hex, the very short length of the tool can be best utilized in very tight installations. As this wrench is operated clockwise to turn the screw into the nut, the pulley must be held from turning. For this purpose, tangs 166 and 168 are provided on first and second plates 130 and 132. Either of these tangs can be gripped by a small, commonly available, adjustable wrench, preferably a crescent wrench. First screw 174 is rotated clockwise until the hub is pulled from the shaft.

To install a hub with the present invention, two sequential procedures are performed. Referring to FIG. 21, the parts are shown prior to assembly into the initial installation configuration, first nut 128 is threaded onto large thread 125 of second screw 124. Nut 128 is installed inverted from the orientation shown in FIG. 17. Washers 176 and 178 and needle thrust bearing assembly 178 are assembled as shown. Hub 40 is passed over screw 124, and threaded elongation 126 is threaded finger tight into shaft 44. In an alternate construction, thrust bearing means is provided by a ball type thrust bearing, either banded or unbanded, in place of washers 176 and 180, and needle thrust bearing assembly 178. In FIG. 23, it is shown that nut 128 is screwed all the way onto screw 124, and threaded elongation 126 is screwed as far into shaft 44 as the interference between the end of the shaft 44 and the end of the hub 40 will allow. The hexagonal end of screw 124 is now held stationary by a 15/16 inch wrench, while the 15/16 inch hex on nut 128 is rotated clockwise by a second wrench. In the preferred embodiment, nut 128 is rotated thirteen turns clockwise advancing the nut to the position shown in FIG. 23 and completing the initial installation procedure. Hub 40 has been partially pressed onto shaft 44 as shown in the figure.

In FIG. 24, second screw 124 has been unscrewed from shaft 44, and cup 182 has been slipped over threaded elongation 126. First nut 128 has been rotated counterclockwise sufficiently to allow large thread 125 to abut the bottom of the recess in cup 182. Threaded elongation 126 has again been threaded finger tight into shaft 44 until cup 182 abuts the hub 40. The assembly is now configured to begin the final installation procedure.

The hexagonal head of second screw 124 is again held from rotation with a 15/16 inch wrench, while the 15/16 inch hex of first nut 128 is rotated clockwise forcing hub 40 onto shaft 44 until surface 184 abuts the end of shaft 44. The end surfaces of shaft 44 and hub 40 are now perfectly coplanar, at the plane defined by the surface 184 of cup 182, and the belt system is therefore axially aligned perfectly.

Had the initial installation procedure proceeded past the thirteen turn, the end of the shaft 44 would have passed into the inside diameter of washer 180 resulting in an axial misalignment error. Additionally, the tool would have to be extended in length to provide for the additional travel required, reducing the ease of use in tight installations.

Thus it can be seen that the hub installing and removing tool of the invention provides a compact, low cost, low friction means to remove and precisely install hubs that can be supplied in after market equipment kits and sold in automobile supply stores.

While the above description contains many specificities, these should not be construed as limitations on the scope of the invention, but rather as an exemplification of one preferred embodiment thereof. Many other variations are possible. Accordingly, the scope of the invention should be determined not by the embodiments illustrated, but by the appended claims and their legal equivalents.

What is claimed is:

1. Apparatus for removing a hub from a shaft wherein said hub has a flange and said shaft has an axially drilled hole, comprising:

a first screw, a first nut housing threads for engaging said first screw, a first plate abutting said hub and said nut including first slot means for locationally engaging said flange on said hub and second slot means for locationally engaging said nut, a second plate abutting said hub and said nut including third slot means for locationally engaging said flange on said hub and fourth slot means for locationally engaging said nut, clamping means for holding said first plate and said second plate in contact with said hub and said nut, a pin axially abutting said screw, said pin also axially abutting the end of said axially drilled hole in said shaft.

2. The apparatus of claim 1 which further includes a ball inserted between and abutting against said pin and said end of said axially drilled hole in said shaft.

3. The apparatus of claim 1 which further includes a second screw for temporary engagement with said first nut to permit alignment of said plates and clamping means during an initial assembly step.

4. The apparatus of claim 3 in which said second screw includes threads for engaging said first nut.

5. The apparatus of claim 3 in which said second screw engages said shaft and first nut simultaneously.

6. The apparatus of claim 5 in which said shaft has internal threads and said second screw includes a threaded elongation which threadably engages said internal threads.

7. The apparatus of claim 6 in which the screw thread pitch of each of said first nut, said internal threads of said shaft, said second screw and said elongation are all identical.

8. The apparatus of claim 1 wherein said first plate further includes a first tang.

9. The apparatus of claim 1 wherein said first nut further includes a nut flange.

10. The apparatus of claim 9 wherein said second and fourth slot means locationally engage said nut flange.

* * * * *